US005707673A

United States Patent [19]

Prevost et al.

[11] Patent Number: 5,707,673

[45] Date of Patent: Jan. 13, 1998

[54] PROCESS FOR EXTRACTING LIPIDS AND ORGANICS FROM ANIMAL AND PLANT MATTER OR ORGANICS-CONTAINING WASTE STREAMS

[75] Inventors: John E. Prevost; Robert D. Clay; John R. Fielding, all of Baton Rouge, La.

[73] Assignee: PreWell Industries, L.L.C., Jackson, Miss.

[21] Appl. No.: 726,239

[22] Filed: Oct. 4, 1996

[51] Int. Cl.[6] .......... A23D 9/02

[52] U.S. Cl. .......... 426/417; 426/429; 426/430; 426/442; 426/425; 426/489; 426/492; 210/634; 210/650; 210/651; 210/652; 554/9; 554/12; 554/16; 554/20

[58] Field of Search .......... 554/9, 12, 16, 554/20; 426/417, 429, 430, 442, 475, 474, 478, 489, 492, 495; 210/634, 650, 651, 652

[56] References Cited

U.S. PATENT DOCUMENTS

| | | | |
|---|---|---|---|
| 1,802,533 | 4/1931 | Reid | 554/16 |
| 1,849,886 | 3/1932 | Rosenthal | 554/210 |
| 2,247,851 | 7/1941 | Rosenthal | 99/2 |
| 2,281,865 | 5/1942 | Van Dijck | 196/13 |
| 2,538,007 | 1/1951 | Kester | 99/153 |
| 2,548,434 | 4/1951 | Leaders | 260/428.5 |
| 2,560,935 | 7/1951 | Dickenson | 260/412.4 |
| 2,564,409 | 8/1951 | Rubin | 260/412.8 |
| 2,682,551 | 9/1954 | Miller | 260/412.8 |
| 2,727,914 | 12/1955 | Gastrock et al. | 260/412.4 |
| 3,261,690 | 7/1966 | Wayne | 99/80 |
| 3,565,634 | 2/1971 | Osterman | 99/18 |
| 3,923,847 | 12/1975 | Roselius | 260/412.8 |
| 3,939,281 | 2/1976 | Schwengers | 426/11 |
| 3,966,981 | 6/1976 | Schultz | 426/425 |
| 3,966,982 | 6/1976 | Becker et al. | 426/430 |
| 4,331,695 | 5/1982 | Zosel | 426/430 |
| 4,617,177 | 10/1986 | Schumacher | 422/273 |
| 4,675,133 | 6/1987 | Eggers et al. | 260/412.2 |
| 4,744,926 | 5/1988 | Rice | 260/412.2 |
| 4,765,257 | 8/1988 | Abrishamian et al. | 110/342 |
| 4,770,780 | 9/1988 | Moses | 210/634 |
| 5,041,245 | 8/1991 | Benado | 260/412 |
| 5,210,240 | 5/1993 | Peter | 554/11 |
| 5,281,732 | 1/1994 | Franke | 554/16 |
| 5,405,633 | 4/1995 | Heidlas et al. | 426/442 |
| 5,482,633 | 1/1996 | Muraldihara | 210/651 |
| 5,525,746 | 6/1996 | Franke | 554/12 |

OTHER PUBLICATIONS

W. H. Hui, Bailey's Industrial Oil and Fat Products, John Wiley Publishing, Fifth Edition (1996), vol. 4, Chap. 10 entitled "and Edible Oils" at pp. 256–275.

S.S. Koseoglu et al., Membrane Processing of Crude Vegetable Oils: Pilot Plant Scale Removal of Solvent from Miscellas, Food Protein Research and Development Center, Texas Engineering Experiment Station, Texas A & M University System, JACCS, vol. 67, No. 5 (May 1990).

U.S. Filter Brochure (1992) describing MEMBRALOX® Filters.

*Primary Examiner*—Ernest G. Therkorn

*Attorney, Agent, or Firm*—Roy, Kiesel & Tucker

[57] ABSTRACT

In a solvent extraction process for the extraction of an extractive from extractive-containing material employing in an extraction zone operating under extraction conditions a process solvent, whereby a miscella comprising a portion of the process solvent and a portion of the extractive, and an extractive-depleted substrate is formed, the improvement to which comprises: (a) removing the miscella from the extraction zone under extraction conditions, (b) filtering the miscella by use of a microfiltration, an ultrafiltration, a nanofiltration, or a reverse osmosis membrane, under conditions which achieve a differential pressure across said membrane, to separate the solvent in the miscella from the extractive in the miscella, and (c) recycling under extraction conditions at least a portion of the separated solvent to the extraction zone.

24 Claims, 5 Drawing Sheets

PROCESS FOR EXTRACTING LIPIDS AND ORGANICS FROM ANIMAL AND PLANT MATTER OR ORGANICS-CONTAINING WASTE STREAMS

FIELD OF THE INVENTION

This invention relates to solvent extraction of lipids from animal and plant matter, as well as organics from organics-containing waste streams to produce a recyclable solvent rich permeate stream, an extractive rich retentate stream, and an extractive-depleted substrate stream.

BACKGROUND OF THE INVENTION

For purposes of this invention, the term "extraction conditions" is defined to be those temperatures and pressures necessary for a normally gaseous C3 or C4 hydrocarbon to exist as a liquid. A "process solvent" is defined to consist of one or more normally gaseous C3 or C4 hydrocarbons which can be converted to a liquid under the extraction conditions. An "extractive" is defined to include lipids and/or constituents of lipids, and/or any other organic compound that is soluble under extraction conditions in a process solvent.

The use of solvents to extract specific compounds from a feedstock is well known. Some of the more commercially developed uses of solvent extraction can be found in the petroleum refining industry, the chemical processing industry, and the food industry.

In the petroleum refining and chemical processing industries, solvents are used to treat certain organics bearing waste streams, such as water/oil emulsions, impoundment pit sludge, oily sludge from refinery operations, storage tank bottoms sludge, and the like, to remove these organics, prior to discharge, recycling, or subsequent refining treatment of the stream. In such processes, it is recognized that many compounds that are gases at normal ambient temperatures and pressures can be converted to near or supercritical fluids by subjecting them to temperatures and pressures near or above critical limits, and the resulting fluid may have solvent properties, particularly for organic materials. One such recognized compound is propane. Examples of such processes and process equipment are described in U.S. Pat. Nos. 4,765,257, 4,770,780, 4,848,918, and 4,877,530.

In the food industry, lipids, including various waxes (more particularly, the long-chain carboxylic acids and long-chain alcohol's constituents), oils and fats (more particularly, the triglycerides), found in plants and animals, are commercially extracted through the use of solvent extraction processes. Particular feedstocks include oleiferous plant materials (beans and nuts), including oil-seeds (soybeans, cottonseed, linseed, peanuts, palm nut, coconuts and cocoa beans), oil-seed derivative products (cocoa liquor), cereal brans, and fruits, as well as animal meats, and even cooked plant and animal materials. In many cases, both the extracted lipids, as well as the lipin-depleted feedstock, are valuable products used in cooking, food, animal feed and fodder, cosmetics, lubricants, insecticides, and fungicides.

Commonly, primary recovery of the oils from seeds and vegetable matter is accomplished by crushing and, if the oil content is high, pressing the oleiferous material in suitable machinery to remove a portion of the oils. However, such pressing leaves a large fraction of the oils in the press cake. For example, after compression of oil from cotton seed, about 10% to 15% of the oil in the seed remains in the pressed cake. Typically, a suitable solvent extraction process is used to recover the residual oil in the press cake. Oil extraction processes are also used to remediate oil contaminated soils and waste streams.

Currently, hexane is the most commonly commercially used. solvent in the food industry. Hexane, and other C5+ hydrocarbons, have been preferred because they are liquids at ambient temperatures and pressures which make them safe and easy to handle in relatively simple and low cost, low pressure equipment. Thus, oil-bearing materials can be readily conveyed continuously into and out of the extraction zone so the hexane extraction processes can be readily adapted to be continuous processes which make scale up to high production volumes more cost effective than batch processes. In addition, hexane is generally safer than many of the C3 and C4 hydrocarbon solvents which can be explosive when mixed with air. This has been one of the primary reasons that hexane has in the past been a more preferred solvent than propane and similar potentially explosive solvents.

Generally, hexane has proven to be an effective and economical extraction solvent. Hexane processes effectively extract fat and oil from animal and plant substrates over a wide range of fat and oil concentrations and reduces residual fat and oil content in the substrates to relatively low levels, typically to less than 1% by weight. However, extraction processes using hexane or other C5+ liquid hydrocarbon as the extraction solvent have significant disadvantages. Many C5+ hydrocarbons are now recognized to be toxicologically harmful even at low concentrations when ingested by humans and animals. For this reason, the residual hydrocarbon content in the edible fats and oils and in the fat and oil-depleted solid substrate produced by extraction processes must be reduced to extremely low levels to meet health standards. Solvent removal from the extracted fats and oil, as well as from the fat and oil depleted animal and plant matter is usually accomplished by distillation, thermal flashing, or stripping techniques. Because C5+ hydrocarbons have relatively low volatilities and strong affinity for the extracted fats and oils, as well as the fat and oil-depleted substrate, relatively high temperatures and severe stripping conditions and techniques must be used to strip residual solvent. In many instances, these severe conditions degrade and impair important quality characteristics such as color, taste and digestibility of both the extracted fats and oils and the depleted solids, and thus reduce their economic value. Moreover, even when using high temperatures and severe stripping conditions, it is many times not possible to reduce C5+ hydrocarbon concentrations in the products to acceptably safe low values. For example, it has been reported that the residual hexane content of hexane extracted rapeseed solid residues can not be reduced below about 0.2% hexane by weight, which is unacceptably high, even using stripping conditions which approach thermally decomposing the rapeseed.

To overcome the problems with the C5+ solvents, there has been a greater willingness to use certain normally gaseous C3 and C4 hydrocarbon solvents, particularly propane, which can be more easily separated from the extractive and extractive-depleted feedstocks. These solvents are generally gaseous at ambient temperatures and pressures, and therefore, to achieve the desired oil extraction must be introduced into the extraction vessel under pressure and temperature conditions that convert them to liquids.

However, the potential explosive characteristics and the necessity to operate under pressurized systems cause such liquified solvent extraction processes to require relatively high energy and capital equipment costs. For example, in a typical propane extraction process, the propane and extractive-bearing material are contacted in a sealed, pressurized vessel that is operated under conditions to maintain the propane as a liquid. The resulting extractive-rich miscella comprising the extractive and a small portion of the liquid propane are separated from the extractive-depleted substrate. In these prior art processes, the propane is then separated out of the miscella for the purpose of recycling the propane back to the extraction vessel. In present commercial operations, this separation is accomplished outside the extraction vessel by distillation and/or flashing the solvent out of the solvent-rich permeate stream. These separation steps require the introduction of heat into the process which drives up the energy costs. The amount of heat necessary depends on the solvent and the amount of solvent to be heated. Once the solvent is separated from the extractive, it will be recycled for use in the extraction vessel. However, the liquified solvents which have reverted to their normally gaseous state during the stripping operation must then be re-cooled and pressurized back to convert them to a liquid before they can be recycled into the extraction vessel. This step introduces yet more energy costs to the process. However, to not reuse the solvent would render the process uneconomical. In large volume industries, such as petroleum refining, chemical processing, and food processing, even a small percent energy saving translates into large economical savings. Examples of such processes and process equipment are illustrated in U.S. Pat. Nos. 1,802,533, 1,849,886, 2,247,851, 2,281,865, 2,682,551, 2,281,865, 2,538,007, 2,548,434, 2,560,936, 2,564,409, 2,682,551, 2,727,914, 3,261,690, 3,565,634, 3,923,847, 3,939,281, 3,966,981, 3,966,982, 4,331,695, 4,617,177, 4,675,133, 5,041,245, 5,210,240, 5,281,732, 5,405,633, 5,482,633, and 5,525,746.

As reported in S.S. Köseoglu et al, *Membrane Processing of Crude Vegetable Oils: Pilot Plant Scale Removal of Solvent from Oil Miscellas*, JACCS, Vol. 67, no. 5 (May 1990), research has been conducted by the Food Protein Research and Development Center, Texas A&M University, wherein membrane separation of a miscella formed during a hexane, ethanol, or isopropanol extraction process has been used to attempt the separation of the solvent from the extracted oil. This research indicated that in pilot plant trials satisfactory hexane separation was not successful with hollow-fiber membranes, but that polyamide membranes might be acceptable when the solvent was hexane. It was further reported that fluxes achieved during separation were increased by increases in temperature and pressure and decreased by increases in oil concentration in the miscella.

Accordingly, for the foregoing reasons there is a need for a solvent extraction process which utilizes a liquified solvent so that residual solvent concentration in the extractive and extractive-depleted substrate can be reduced to safe low levels without degrading the products; that can be cost effectively adapted to continuous operation requiring continuous feed of extractive-bearing material into the extraction zone and continuous removal of liquified solvent-rich permeate and extractive-depleted substrate from the extraction zone; and that reduces the cost of energy and capital necessary to recycle the liquified solvent for use in the process. These and other objects and objectives of this invention will become apparent from the ensuing descriptions of the invention.

SUMMARY OF THE INVENTION

Applicants have discovered that the objectives of this invention can be achieved through the use of a process solvent extraction process wherein the miscella formed during the extraction step is filtered under extraction conditions to form (a) a process solvent-rich permeate that is substantially extractive free, and which can be directly recycled to the extraction zone without further processing, and (b) an extractive-rich retentate that is substantially solvent free, and that requires substantially less energy and a reduced amount of equipment to satisfactorily separate the process solvent from the extractive-rich retentate.

In a preferred embodiment, the present invention is directed to a process for extracting lipids from lipid-bearing animal or plant materials using a process solvent as the extraction solvent. The most preferred solvent is propane. The lipid-bearing material is treated with the liquid solvent in an extraction vessel to form a miscella and a lipid-depleted substrate. While maintaining extraction conditions, the miscella is passed through suitable microfiltration, ultrafiltration, nanofiltration, or reverse osmosis membranes to form a process-rich permeate that is directly recycled back to the extraction zone without having to go through a thermal vaporization, compression and condensation cycle, and a lipid-rich retentate stream. The lipid-rich retentate stream is then subjected to further conventional treatment, such as thermal stripping or distillation, to separate and recover the remaining solvent that is in the lipid-rich retentate stream. This stripped solvent vapor can then be compressed, condensed and recycled to the extraction zone to minimize any requirement to add makeup process solvent. The separated lipids can then be recovered and sold as a separate commercial product. Separately, the lipid-depleted substrate is subjected to an appropriate thermal stripping operation to strip residual process solvent out of the substrate. The solvent vapor stripped out of the substrate can also be compressed, condensed and recycled to the extraction zone. The remaining substrate material, or cake, can then be recovered and sold as a second separate commercial product.

Because the large bulk of the process solvent is removed during the filtration step, less material must be moved through the subsequent stripping, compressing and condensing steps resulting in substantial energy savings. For the same reason, smaller stripping, compressing, condensing and distillation units need to be employed for processing the same amount of feedstock in a conventional solvent extraction process. Accordingly, such filtration separation techniques are very capital and operating cost effective and energy efficient.

Other aspects of the present invention are aimed at adapting the process to continuous operation. The process ie preferably operated continuously to be cost effective for large scale, high volume operation. Continuous operation is accomplished by using a continuous extractor which is comprised of an auger screw conveyor in a sealed pressure vessel operated under extraction conditions and containing process solvent. Under pressure, extractive-bearing materials are fed continuously into the feed end of the auger screw. The auger screw conveys the materials through the extraction zone. Process solvent is dripped or sprayed on the materials from above the auger from one or more points and flows by gravity down through the materials. The auger mixes and tumbles the materials providing effective contact between the process solvent and the extractive-bearing materials to promote effective extraction of extractive from the materials to form a miscella. The miscella collects in the bottom of the extractor. The extractor bottom is comprised of porous surfaces through which the miscella is withdrawn from the extractor. The pores of the porous surfaces are sized to permit the passage of the miscella, but to retain the extractive-depleted materials in the extraction zone. The miscella is then passed under extraction conditions through the filtration membranes and the process continues as set forth above.

The auger conveyor conveys the extractive-depleted materials out of the extraction zone. In a preferred embodiment, the auger conveyor or the extractor will be constructed so that the extractive-depleted material will be compressed to remove any miscella trapped in the material. This may be accomplished in one embodiment wherein the auger conveyor screw includes a number of compaction screw flights on its outlet end which squeezes the miscella out of the extractive-depleted materials prior to the discharge of the materials from the extractor. It is also preferred that the compaction screw flights form a seal with a screw barrel which prevents flow of solvent vapor from the extractor. In a second embodiment, the extraction vessel is constructed having a truncated conically shaped discharge end which, with a constant diameter screw, will similarly squeeze the miscella out of the extractive-depleted materials.

If the extractive-bearing material has a large physical structure which for commercial reasons can not be crushed or ground, then it is preferred that the continuous extractor comprise a moving belt conveyor or a moving belt conveyor with hoppers mounted on the belt to hold the extractive-bearing material. In this embodiment the belt or hoppers would be provided with openings which permit only the miscella to drain to the bottom of the extraction chamber where it can be collected and directed to the filtration membrane.

Another aspect of this invention directed to continuous operation addresses the problem of continuously feeding extractive-bearing materials into the extractor, which contains a process solvent, such as propane. With the use of propane as the process solvent, a certain amount of propane vapor is likely to be present under extraction conditions. Therefore, it is preferable to prevent air from entering the extractor vessel to avoid forming explosive oxygen/propane vapor mixture in the extractor vessel. Two methods have been devised for continuously feeding the extractive-bearing materials into the extraction zone. One method is to employ two or more pressurized alternating hoppers in a sequential air purging/charging operation that alternates between the hoppers. Another system is to form a pumpable paste or slurry of extractive-bearing materials in the extractive being extracted and to pump the paste or slurry into the extractor.

Similarly, another aspect of this invention addresses the problem of discharging the extractive-depleted materials from the extractor without releasing process solvent vapor from the extractor. Two alternative ways to overcome this problem are disclosed. One way is to use a pressurized alternating hopper system similar to the materials feed system. Alternatively, the extractor can comprise a compaction screw which receives extractive-depleted materials. This screw conveys the extractive-depleted materials out of the extractor while maintaining a seal against flow of process solvent vapor out of the extractor.

Still another aspect of the present invention pertains to grinding or crushing, under extraction conditions, the extractive-bearing materials into particles that are optimally sized for solvent extraction to prevent the commercial degradation of the resultant extractive-depleted materials.

These and other features, aspects and advantages of the present invention are presented in the following description, appending claims and accompanying drawings.

DESCRIPTION OF THE PREFERRED EMBODIMENTS OF THE INVENTION

Feedstocks which can be treated by the process of this invention are varied, and includes any extractive-bearing material. Depending on the material's physical structure and shape, the need to comminute the material before or during the processing, or the need for gentle physical treatment of the material during the extraction process, the type of extraction reactor used can vary. The preferred embodiments of the invention illustrated in FIGS. 1–3 will be described utilizing oleaginous animal or plant materials, while solid materials that must be gently handled and can not easily or desirably be transported by an auger, such as shop towels and clothing, will be used to describe the preferred embodiments of the invention illustrated in FIGS. 4, 5A, and 5B.

With certain materials it is desirable to first break down the cellular structure in which the extractive is contained. For example, seeds often times have to be delinted, dehulled, cracked and flaked. In addition, it may be desired or required to comminute such materials to fine flakes, granules or particles either to achieve the desired commercial size or to increase the exposed surface area to increase exposure to the process solvent.

In one embodiment of this invention, particle size preparation and reduction can be accomplished by any conventional method now used for the feedstock being processed. However, in a preferred novel embodiment illustrated in FIG. 2 and discussed below, the comminution is performed under extraction conditions, and more preferably, in the presence of the selected process solvent. Typical extraction conditions include temperatures that range from about ambient to about 140° F. and pressures that range up to 200 psig.

Some oleaginous raw materials, such as cocoa beans, are difficult to grind to extractable particle size distribution. These materials express their oil to form a paste before they can be finely granulated. The solid in this paste form can not be effectively ground and is difficult to transport and handle. For these materials it is preferred to grind and extract the materials in two or more stages wherein the oleaginous solid is first ground or crushed, more preferably under extraction conditions, to a size that does not result in the formation of a paste. This material can then be treated with a process solvent in the manner described below to remove oil, and then the partially oil depleted material can then be further ground, again preferably under extraction conditions.

Figure 1:
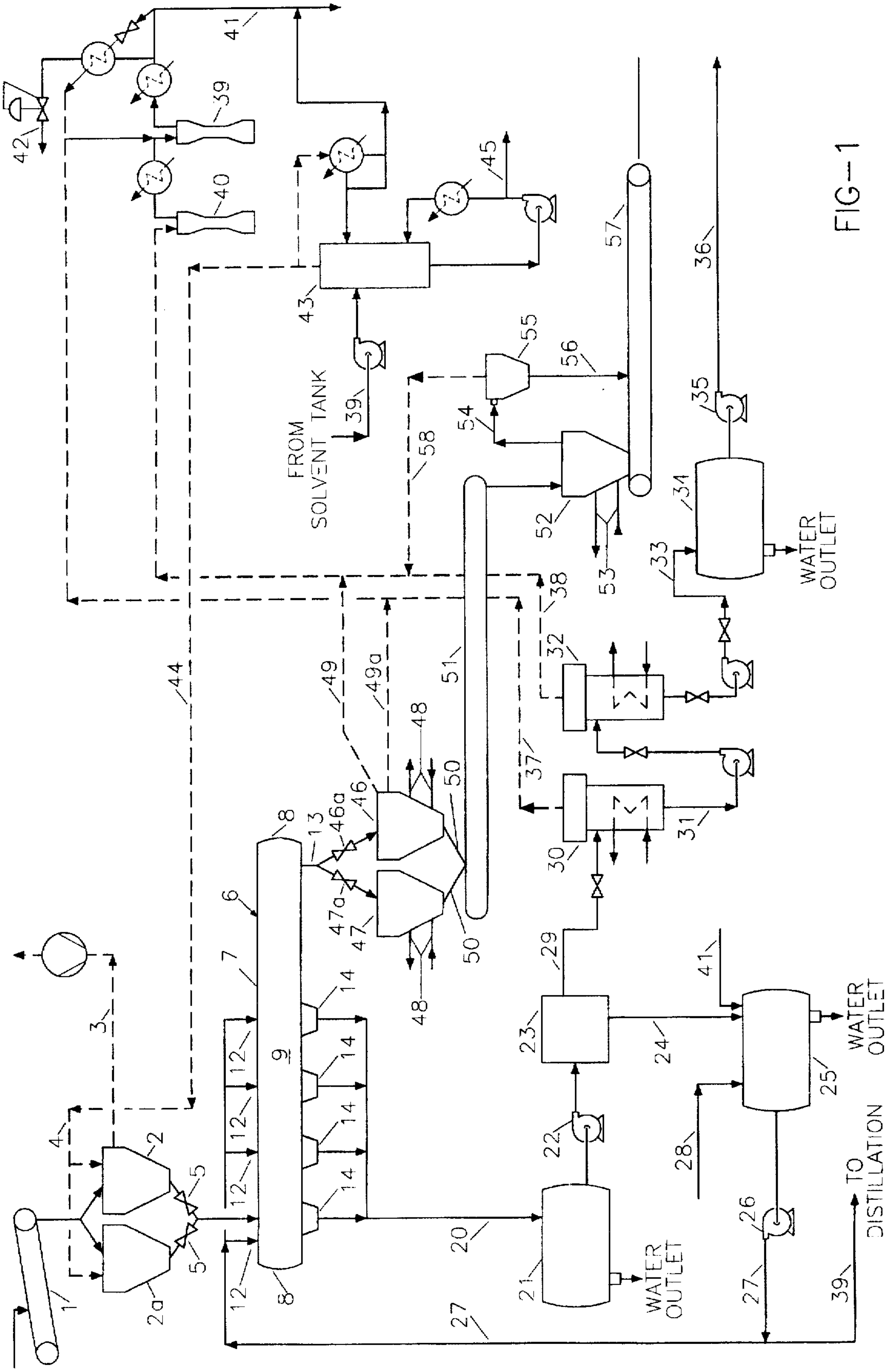
FIG. 1 is a schematic drawing of the combination of equipment and material flow process of a preferred embodiment of the invention.

Turning now to FIG. 1, the feedstock, comprising lipid-bearing animal or plant material, is first fed by belt conveyor 1 into a first feed hopper 2. If desired, the feedstock may be introduced into hopper 2 as a slurry. Hopper 2 is sealed and the air preferably removed by conventional vacuuming or replacement techniques and vented through vent line 3. Hopper 2 is then pressurized with an inert gas, or preferably with the selected process solvent in its vapor state, which is introduced into hopper 2 by line 4. In one preferred embodiment the vaporized process solvent will be obtained from distillation column 43 as described below. This preferred embodiment reduces the amount of inerts in the system which ultimately reduces the amount of process solvent loss that occurs when the inerts are vented from the system. This embodiment also has the benefit of speeding up the process because air is more easily removed at this stage of the process than at any other stage of the process. In addition, this embodiment minimizes the potential safety problem associated with mixing air and volatile solvents such as propane. Valve 5 is then opened to permit the lipid-bearing material to flow into the extraction vessel 6. Valve 5 may be any full ported valve that is bubble tight, such as a ball valve. Extraction vessel 6 is maintained at temperature and pressure conditions that will permit the solvent to remain in a liquid state.

Figure 3A:
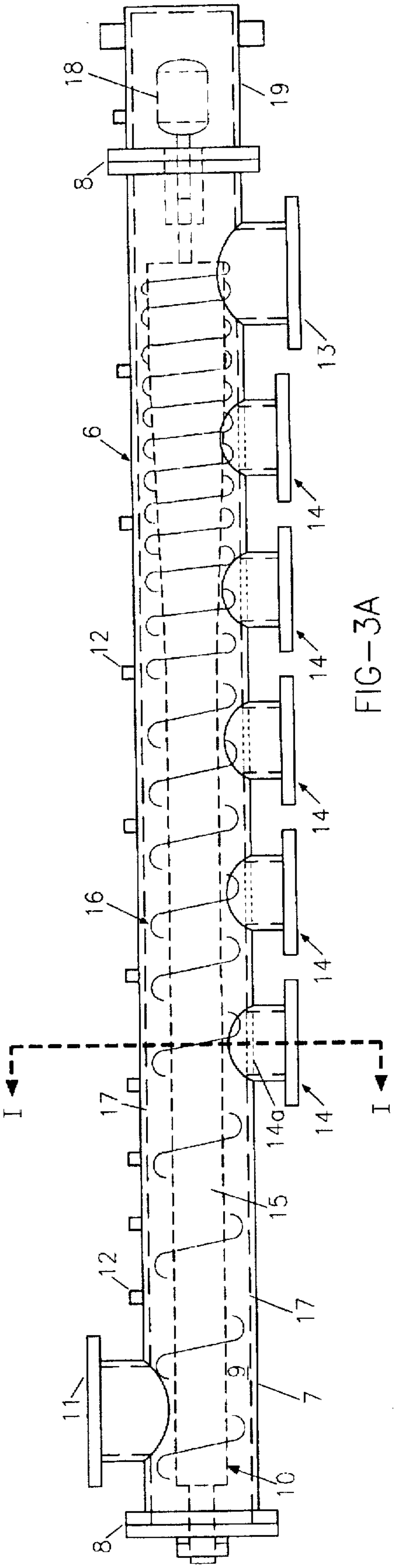
FIG. 3A is a cross-sectional view of one preferred embodiment of the extraction chamber of FIGS. 1 and 2 utilizing a conveyor screw having graduated diameters screws and miscella/oil depleted materials screen separator.

The extraction vessel 6, as illustrated in FIG. 3A, will preferably be constructed having side and end walls 7 and 8, respectively, forming a horizontal, elongated, tubular chamber 9 into which a rotatable, helical, auger screw conveyor 10 is operatively mounted in the opposing end walls 8. The feedstock passing through valve 5 enters chamber 9 through flange 11 located at one end of chamber 9 and is fed onto screw conveyor 10. The top half of side wall 7 is provided with a series of process solvent inlets 12 preferably extending along the length of chamber 9, but terminating sufficiently forward of lipid-depleted substrate outlet 13 to prevent excessive process solvent from exiting through outlet 13. The process solvent is sprayed or dripped onto the feedstock as it is transported through chamber 9 by screw conveyor 10. The bottom half of side wall 7 is constructed having a series of screened outlets 14 spaced along the length of chamber 9 that are sized to permit the miscella to pass through, but which are too small to permit passage of any substantial portion of the lipid-depleted substrate. The pore size of the screen outlets 14 for most feedstock streams, such as oleaginous material, is set at 0.1 to 10 microns. The bottom half of side wall 7' is also constructed having an outlet 13 located at the opposite end of chamber 9 from the flange 11 to permit the oil depleted substrate to be removed from the chamber 9 by the screw conveyor 10.

In a more preferred embodiment, screw conveyor 10 is an auger type constructed with a center shaft 15 whose diameter increases along the horizontal center axis of chamber 9 beginning at flange 11 and ending at outlet 13. In this embodiment, miscella which has not drained from the lipid-depleted substrate can be pressed out of the substrate prior to the substrate being removed from chamber 9. In a more preferred embodiment, the increase in the shaft diameter does not begin to increase until the mid-point of the chamber axis, and more preferably not until the later one-third of the chamber axis. In these preferred embodiments, it is easier to treat more of the lipid-bearing material in the chamber 9. On shaft 15 are helically mounted screws 16 whose pitch increases along the length of shaft 15, and more preferably begin to increase as the screws 16 approach substrate outlet 13. In still another preferred embodiment, screws 16 will have a diameter when mounted on shaft 15 to position their extending edge 17 adjacent the interior surface of side wall 7 to better control the flow of material through chamber 9 and to prevent the screened miscella outlets 14 from becoming easily clogged with the lipid-depleted substrate.

Operatively fixed in a conventional manner to one end of shaft 15 is motor 18 which may be pneumatically driven, hydraulically driven, or otherwise conventionally driven, to rotate shaft 15. Motor 18 is located in extraction vessel extension housing 19 flanged to one of the end walls 8. Housing 19 will be provided with the necessary fluid couplings to control the fluid flow to and from the motor 18 that is operated in a conventional manner.

Figure 3C:
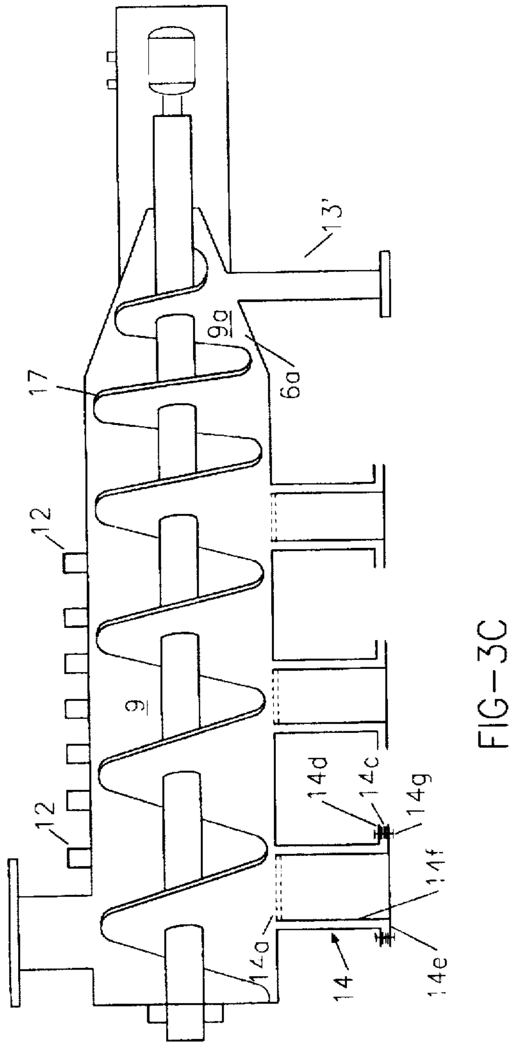
FIG. 3C is a cross-sectional view of another preferred embodiment of the extraction chamber of FIGS. 1 and 2 utilizing an extractor constructed with a truncated, conically shaped discharge end, a conveyor screw and miscella/oil depleted materials screen separator.
Figure 3B:
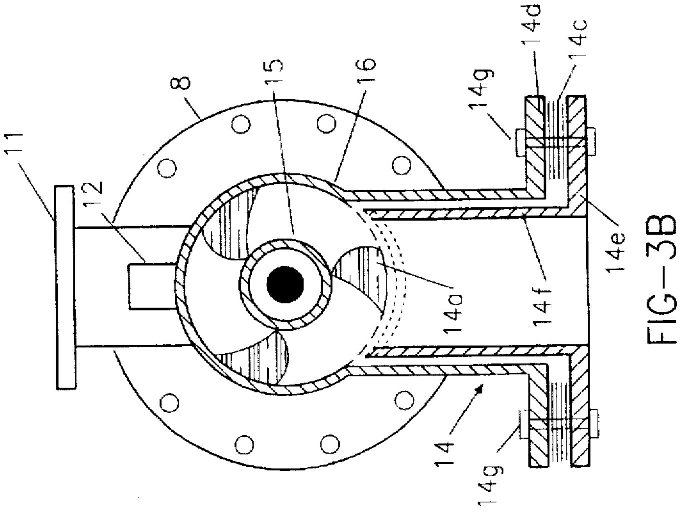
FIG. 3B is a cross-section view taken along line I—I of FIG. 3A.

In an alternate embodiment illustrated in FIG. 3B, the desired distance between the screen outlets 14 and the shaft edge 17 can be achieved by constructing the screen outlets 14 in a manner which permits them to be vertically adjustable. The advantage of this embodiment is reduction in capital cost through use of conventional sized augers, as well as permits easier adjustment that may be necessary because of extraction chamber fabrication errors. In this embodiment, screen 14*a* is mounted to the top of a support frame 14*f*. Support frame 14*f* is adopted to be vertically adjusted to permit the top surface of screen 14*a* to be positioned substantially flush with the interior surface of side wall 7. The mechanism to achieve the desired vertical adjustment can include a threaded support frame side wall 14*f* which can be screwed into the cavity of outlet 14, as well as any other known similar arrangements. If the length of the vertical adjustment is not great, then the insertion sheaves 14*c* as shown in FIGS. 3B and 3C can be used. In this preferred embodiment, a sufficient number of thin sheaves 14*c* are fitted between the bottom flange 14*d* of outlet 14 and bottom flange 14*e* of support frame 14*f* to achieve the desired adjustment in screen height. Bolts 14*g* are then used to secure the sheaves 14*c* between flanges 14*d* and 14*e* to fix the position of screen 14*a*.

Also illustrated in FIG. 3C is an alternate embodiment wherein the extraction vessel 6 is constructed so that chamber 9 is shaped to have a truncated, conical-shaped discharge section 9*a* This embodiment has several advantages. First the sloped interior wall surface 6*a* forms a natural drainage path for the miscella that will be compressed out of the extractive-depleted material prior to discharge. Secondly, it permits easier placement of screen outlets 14 to ensure passage of all of the miscella from chamber 9. Thirdly, it reduces the possibility that miscella would exit through oil depleted substrate outlets 13. As before, the extractive-depleted material will be compressed as it enters discharge section 9*a* because of the reduced volume. The amount of compression can be controlled by the flow rate of material through the extraction chamber 9 or the amount of the volume reduction in discharge section 9*a*.

Returning to FIG. 1, the miscella which passes through outlets 14 is collected and transported through line 20 to miscella surge tank 21 which can be used to gravity separate any water, or other undesired fluid, that may have been in the miscella. The miscella is preferably kept in both line 20 and in miscella surge tank 21 under extraction conditions. While under these conditions, the collected miscella is then pumped from tank 21 by pump 22 to filtration membrane assembly 23. The pore size and construction of the membrane selected will depend on the extractive and process solvent used in the process, the operating conditions used in the separation, as well as the volume of miscella that is to be treated. The pore size is selected which will permit substantially only the process solvent to pass through the pores. However, it is feasible that small amounts of the extractive may be allowed to pass through the membrane pores. In addition, the filter must be constructed to permit not only operation under extraction conditions, but also to permit sufficient pressure differential to exist on the opposite sides of the membrane to force the solvent through the membrane. Because it is intended that the filtered process solvent be directly recycled to the hoppers 2 or the extraction vessel 6, the pore size is preferably selected to minimize the amount of extractive that can pass through the filter membrane pores. Ideally, no extractive would be permitted to pass.

To permit filtration under extraction conditions and with use of the liquified solvents of this invention, it is preferred that a ceramic filter constructed having a flow through center wall with the desired pore size being formed by alumina, silicon and water, zirconia, silica, or titania compound coating be utilized. More preferably, the coating will be zirconia or titanium oxide. The ceramic filters are preferred because of their ability to withstand wear and be formed with consistent pore size, and to allow operation under pressure. The process solvent along with whatever extractive that passes through the filter membrane is then transported through filtered process solvent transfer line 24 to a process solvent holding tank 25 from which it can be directly recycled when needed to chamber 9 by pump 26 through solvent recycle line 27 or to other uses, such as use in a distillation column 43. It is anticipated that the solvent loss in the preferred process will be less than 0.1% which is substantially better than known prior art processes. However, if necessary, fresh process solvent can be added to solvent holding tank 25 through process solvent makeup line 28 from a process solvent source not shown.

The extractive which does not pass through filter membrane assembly 23 is then transferred by extractive transfer line 29 to a conventional solvent flash unit 30 to separate any process solvent which may still be trapped in the extractive. The extractive is then transferred via transfer line 31 for further treatment in a conventional vacuum flash unit 32 to remove any remaining process solvent from the extractive. This treated extractive is then transported through extractive storage line 33 to an extractive storage tank 34 from which it can be transferred via pump 35 through transfer line 36 to any desired downstream processing. The liquified solvent in a vapor state removed in the units 30 and 32 is transported through solvent vapor transfer lines 37 and 38, respectively, to pressure compressors and LPG vacuum 39 and 40, respectively. The stripped solvent vapor is compressed and condensed to transform it back to the fluid state. This process solvent can then be transferred to process solvent holding tank 25. If desired, line 41 can be vented to release inerts which may be present through inert venting line 42. The venting should be kept to a minimum, as this can result in loss of the solvent from the system. The process solvent introduced into distillation column 43 is transformed to its vapor state and transported via vaporized solvent transfer line 44 back to hoppers 2. Any lipids or other extracted material removed during the distillation is discharged through discharge line 45.

The extractive-depleted material passes through outlet 13 and into lock hopper 46 which is sealingly connected to outlet 13 through valve 46*a*. Any air in lock hopper 46 has been previously removed by LPG vacuum compressor 40 and vented to the atmosphere. Lock hopper 46 is heated water jacket 48 to remove any solvent in the material. The solvent in a vapor state is vented through line 49 to LPG vacuum compressor 40 or through line 49*a* to pressure compressor 39. The remaining material (raffinate) in the locked hopper 46 is then removed via line 50 and introduced into transfer vessel 51 provided with a screw conveyor and thus transferred through vessel 51 to a surge lock hopper 52. Surge lock hopper 52 is also provided with a water jacket 53 to heat the raffinate to further remove any remaining process solvent. The process solvent in a vapor state is vented through line 54 and into a conventional cyclone or similar separation unit 55 wherein any entrained solids can be separated and discharged via line 56 to conveyor 57. The vaporized process solvent is then transferred via transfer line 58 to line 38 to LPG vacuum compressor 40.

Material in lock hopper 47 is treated in the same manner as the material in lock hopper 46. By having multiple lock hoppers, it is possible to run a semi-continuous, or continuous, process rather than a batch process.

One feature of the FIG. 1 embodiment is that as the lipid-bearing material from hopper 2 is being fed into extractor vessel 6, the second hopper 2*a* can be loaded with additional feedstock. By proper sizing and selection of the number of hoppers and the flow rate into and out of the hoppers, there can be a continuous feeding of lipid-bearing material into chamber 9.

Figure 2:
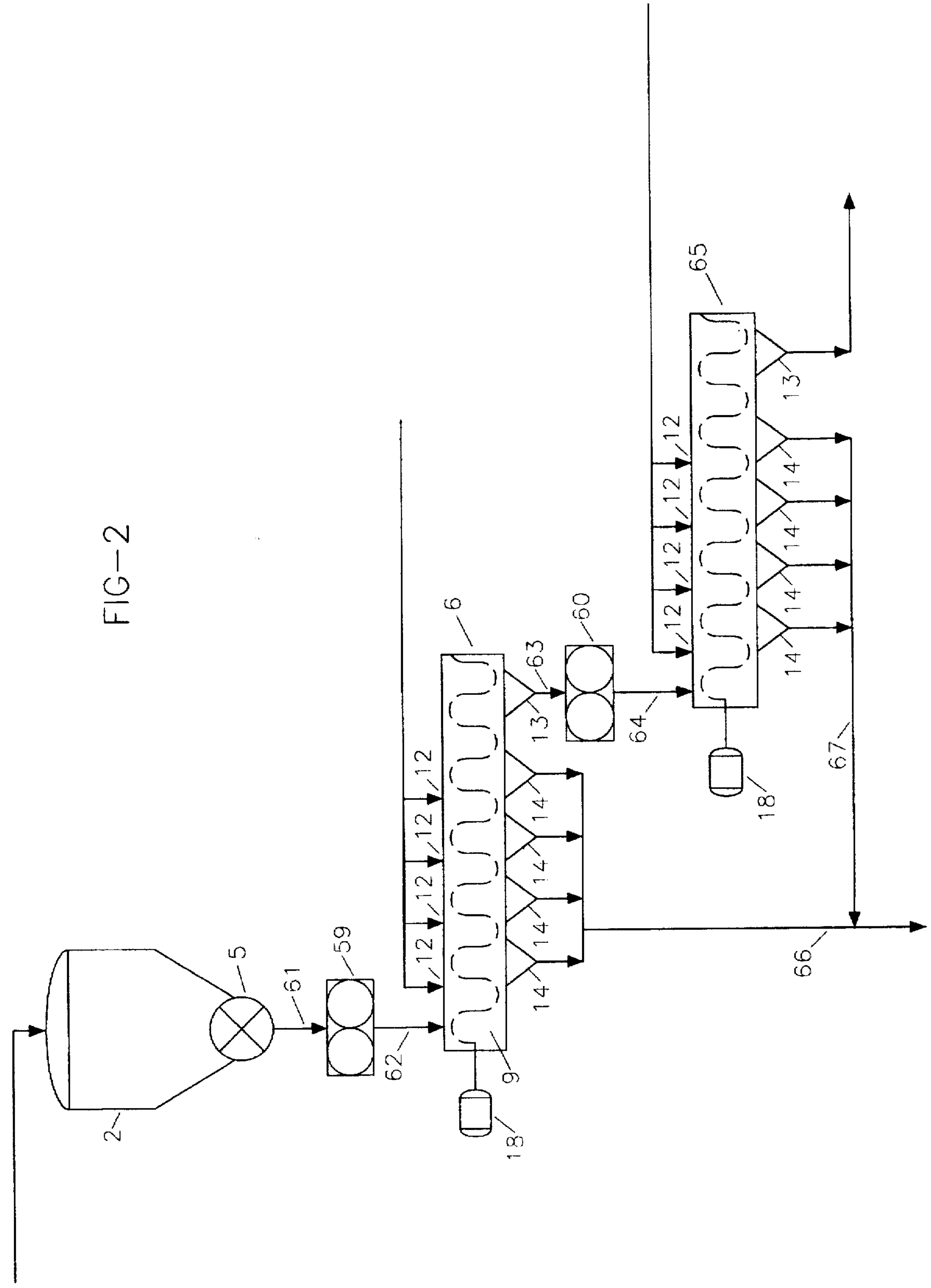
FIG. 2 is a schematic drawing of the combination of equipment and continuous material flow process of another preferred embodiment of the invention which also provides for the crushing or grinding of the feedstock and partially treated feedstock under extraction conditions.

FIG. 2 is an alternative embodiment which employs the use of crushers or grinders 59 and 60 under extraction conditions. More particularly, the lipid-bearing material is fed from hopper 2 under pressure via transfer line 61 through valve 5 into crusher/grinder 59 where the lipid-bearing material is comminuted under extraction conditions. The degree of comminution will depend on the lipid-bearing material. If the material does not readily form a paste, then the material will be comminuted to its final desired size. The comminuted material is then transferred still under pressure via transfer line 62 to chamber 9. However, if the comminuted material could not be reduced to the final desired size, then the substrate exiting through substrate outlet 13 is transferred under pressure via transfer line 63 to the second stage crusher/grinder 60 wherein the substrate is further reduced to the final desired size. The substrate is then transferred under pressure via transfer line 64 to a second extraction vessel 65 that is constructed and operated similarly to extraction vessel 6. The miscella exiting from both extraction vessels is collected and transported under pressure via transfer lines 66 and 67 to miscella surge tank 21, and then further substantially liquified as illustrated in FIG. 1. The substrate containing small amounts of miscella exiting second extraction vessel 65 is then also treated substantially as described above.

Figure 4:
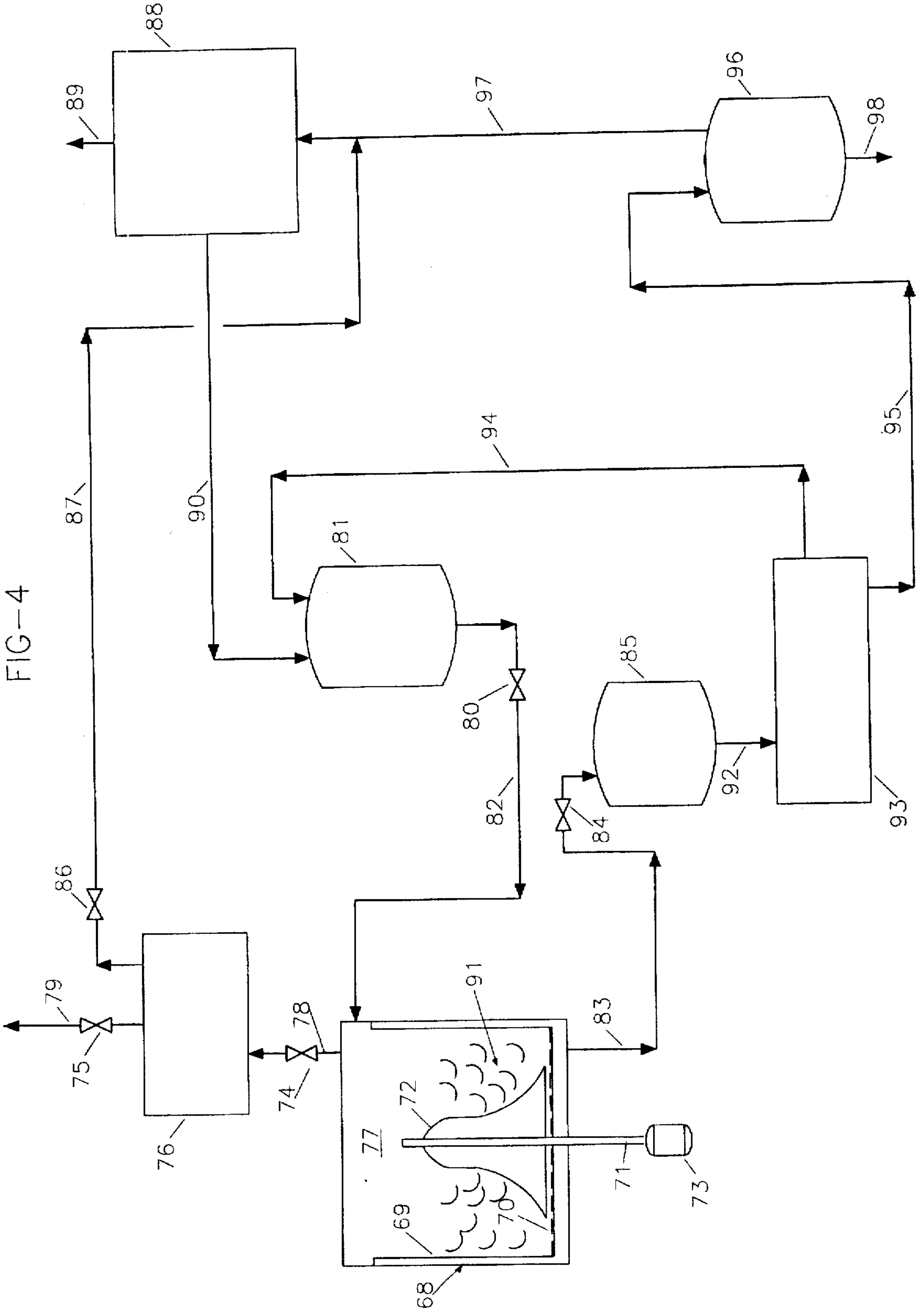
FIG. 4 is a schematic drawing of the combination of equipment and material flow process of a preferred embodiment of the invention useful for treating soiled rags and clothing articles.

Turning now to FIG. 4, the process is illustrated wherein the feedstock comprises material that can not be easily conveyed by a screw conveyor or wherein it is desired that the feedstock receive a more gentle mixing action with the solvent, such as clothing. In this embodiment, the clothing will be loaded by any conventional means into a sealable vessel 68 containing an inner basket 69 that has been provided with extractive drain openings 70. Mounted on drive shaft 71 are agitating blades 72 driven by motor 73 positioned exteriorly of vessel 68. Once the clothing is loaded, valves 74 and 75 are opened. Vacuum pump 76 is then activated to pump the air from inner basket chamber 77 via line 78 and air vent line 79. Once the air has been vacuumed from chamber 77 and valves 74 and 75 closed, valve 80 is opened to permit process solvent, such as propane, from solvent storage vessel 81 to be introduced into chamber 77 via transfer line 82. Chamber 77 will be operated under extraction conditions. Motor 73 is turned on to cause blades 72 to agitate the mixture of process solvent and clothing sufficiently to cause the process solvent to contact and extract the extractive absorbed in the clothing. The miscella formed flows through drain openings 70 and into miscella outlet line 83 which when valve 84 is open permits the miscella to be stored in pressurized vessel 85. If desired, one or more additional cycles of process solvent extraction can be use to assist in the removal of any oil.

When the extraction process has been completed, motor 73 is turned off, and any remaining miscella permitted to drain to miscella storage vessel 85. Once the miscella has drained, valve 84 is closed, and valves 74 and 86 are opened. Vacuum pump 76 is activated to remove any solvent vapor that may remain in chamber 77. The solvent vapor is then transferred via transfer line 87 to a conventional solvent recovery unit 88 which permits the venting of any inerts through vent line 89. Unit 88 also permits the captured solvent in a vapor state to be liquified and transferred via line 90 to process solvent storage vessel 81. The solvent recovery unit 88 may comprise flash vessel, vacuum vessels, compressors and distillation columns such as shown in FIG. 1. Once the vaporized solvent has been removed from chamber 77, extraction vessel 68 is opened to permit the removal of the treated clothing 91.

The miscella in vessel 85 is transferred via transfer line 92 to filtration unit 93 where the extractive and the process solvent are separated. Filtration unit 93 is preferably constructed as described above for filter membrane assembly 23. The separated process solvent is then transferred directly via transfer line 94 to process solvent storage vessel 81. The extractive is then transferred via extractive transfer line 95 to extractive receiver vessel 96 where, if desired, it can be further transferred via transfer line 97 to solvent recovery unit 88 to remove any residual liquified solvent remaining in the extractive. Alternatively, or in addition, the extractive in vessel 96 can be transferred via line 98 to downstream refinement processes.

Figure 5:
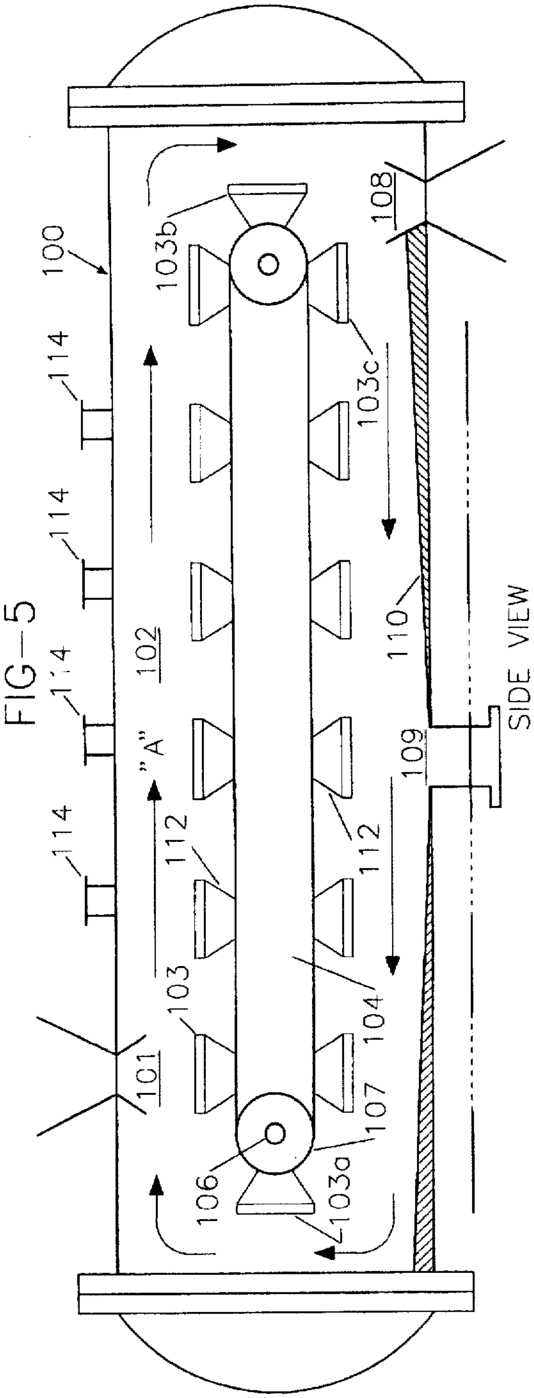
FIG. 5 is a side view of an alternate embodiment of the conveyor system illustrating the use of a moving belt conveyor, and alternatively with mounted hoppers, which can be utilized to move the extractive-bearing material through the extraction zone.
Figure 5A:
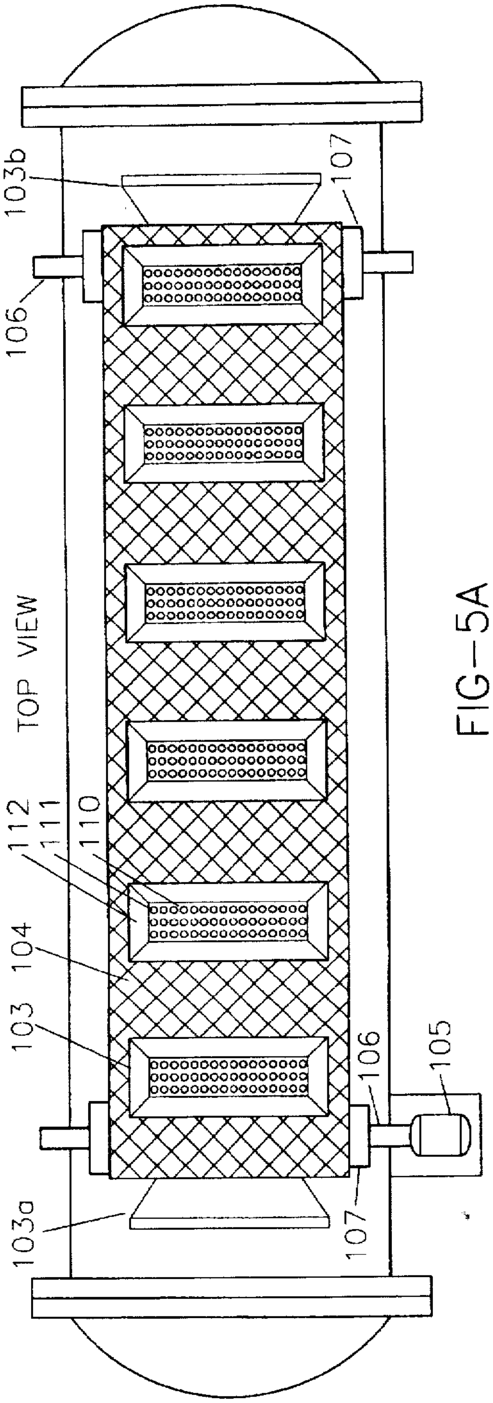
FIG. 5A is a top view of the conveyor system of FIG. 5.

FIGS. 5A and 5B illustrates an alternative method for transporting the feedstock through the extraction zone. This embodiment is particularly useful for feedstock such as clothing or other bulky articles. In this alternate embodiment, the feedstock is introduced into extraction vessel 100 through inlet opening 101 preferably positioned at one end of extraction chamber 102. The introduction of the feedstock can be controlled to permit an amount to fill only one basket 103. In this embodiment, basket 103 will be positioned directly beneath inlet opening 101 to permit the feedstock to be gravity feed directly into basket 103. Once basket 103 is filled, conveyor belt 104 to which basket 103 is fixed is activated to move forward in the direction of arrows "A" by the engagement of motor 105 operatively connected to conveyor belt 104 by conventional axle 106 and engaging roller 107 assemblies. The forward motion is continued until the trailing basket 103*a* is positioned beneath inlet opening 101. The conveyor belt 104 is then stopped long enough for basket 103*a* to be filled. The conveyor belt 104 is then again activated, and the process continued in like manner.

Each basket 103 is fixed to conveyor belt 104 so that when it reaches the position as shown by basket 103*b* and basket 103*c* it will be retained on conveyor belt 104. It is preferred that the floor section 110 forming basket 103 be provided with drain openings 111 sized to permit any miscella formed in basket 103 to drain from basket 103 during its transport through chamber 102. The side walls 112 of basket 103 may likewise have openings that permit the miscella to pass. Such a basket could be constructed having screened sides and floor. Regardless of construction, it is preferred that the size of the opening be such to permit the miscella to drain through, but do not permit the passage of the feedstock or permit any significant portion of the feedstock to extend through the screen openings.

Extraction vessel 100 is also provided with a extractive-depleted substrate outlet 108 structured and positioned to receive the solvent treated material being dumped from basket 103*b*. Extraction vessel 100 will also be provided with one, or more, miscella exit openings 109 to permit the miscella to gravity drain from chamber 102. In a preferred embodiment, extraction vessel 100 will be constructed with a sloped floor 110 that assists in collecting and directing the miscella toward exit opening 109. Positioned on the top surface of vessel 100 are nozzles 114 through which process solvent may be introduced into chamber 102. In a preferred embodiment, nozzles 114 are positioned to introduce the process solvent directly into baskets 103 as each of the baskets passes beneath one of the nozzles.

In operation, air is removed from chamber 102. The feedstock is then introduced into chamber 102 through inlet opening 101 as described above. Chamber 102 is maintained under extraction conditions. Solvent is introduced through nozzles 114 and contacted with the feedstock in each basket 103 as the baskets pass through the chamber 102. The speed of the baskets is preferably controlled to permit the extraction of the oil from the feedstock prior to a basket 103 reaching the position of basket 103*b*. The miscella that is formed drains from the baskets, through belt 104, or drips out of the baskets when they reach the position of basket 103*c*. The miscella collects on floor 110 and is gravity fed to opening 109 where it is collected. The collected miscella can then be treated as shown in FIG. 1. The extractive-depleted substrate is dumped from the baskets as they reach the position of basket 103*b*. The substrate passes through opening 108 and can be further treated as shown in FIG. 1.

Conveyor belt 104 is preferably constructed having mesh openings 113 to permit any miscella which passes through basket 103 and onto belt 104 to continue to pass through belt 104 where it can be collected from floor 110.

There are variations and modifications of the invention as described that would be obvious to one of ordinary skill in the art, and which are intended to be included in the scope of the invention as defined by the following claims.

What is claimed is:

1. A solvent extraction process using a solvent consisting essentially of a process solvent to extract an extractive from an extractive-containing material, the process comprising the steps of;

a. contacting said extractive-containing material with said solvent in an extraction zone operated under extraction conditions to form a miscella and an extractive-depleted substrate;

b. separating said miscella from said extractive-depleted substract under extraction conditions; and c. filtering said miscella by use of a microfiltration, ultrafiltration, nanofiltration, or reverse osmosis filtration membrane under conditions to achieve a differential pressure across said membrane to form separated process solvent-rich permeate and an extractive-rich retentate streams; wherein said filtering of said miscella through said filtration membrane is performed under conditions necessary for at least some of said process solvent to remain in a liquid state, and said permeate in a liquid state is recycled to said extraction zone; and d. subjecting said retentate from step (c) to stripping conditions in a stripping zone such that residual process solvent that may be present in said retentate is stripped out of said retentate to produce an extractive that is essentially free of said process solvent and to produce a vapor stream comprising process solvent in a vapor state.

2. The process of claim 1 comprising the additional step of:

e. discharging said extractive-depleted substrate from said extraction zone into a flash zone which is maintained at a pressure and temperature that induces any residual process solvent in said extractive-depleted substrate to flash out of and separate from said extractive-depleted substrate to form a vapor stream comprised of process solvent in a vapor state and to form a flashed extractive-depleted substrate having a reduced residual process solvent content.

3. The process of claim 2 comprising the additional step of:

f. discharging said flashed extractive-depleted substrate from said flash zone to a stripping zone wherein said flashed extractive-depleted substances are subjected to a pressure and temperature that induce residual process solvent in said flashed extractive-depleted substrate to separate from said flashed extractive-depleted substances to form a second vapor stream comprising process solvent in a vapor state, and a stripped extractive-depleted substrate that is essentially free of said process solvent.

4. The process of claim 3 wherein in said stripping zone and at stripping conditions, said stripped extractive-depleted substrate is additionally contacted with inert gas at conditions that induce residual process solvent to diffuse and separate from said stripped extractive-depleted substrate to form a third vapor stream comprised of process solvent in a vapor state and said inert gas, and to form a second stripped extractive-depleted substrate stream that is essentially free of process solvent.

5. The process of claim 3 comprising the additional steps of:

g. compressing said vapor stream and said second vapor stream;

h. cooling the compressed vapor streams to form process solvent; and i. recycling said process solvent from step (h) to said extraction zone in step (a) as part of the process solvent used in step (a).

6. The process of claim 1 wherein said extraction zone comprises a vessel having walls forming a pressurized chamber in which is mounted a rotating helical auger screw conveyor having its auger screw positioned therein to receive said extractive-containing material, said walls being provided with a first opening through which said extractive-containing material can be introduced into said chamber, said walls being provided with a second opening separated from second opening through which said extractive-deleted substrate can exit from said extraction zone, said extractive-containing material being continuously fed through said first opening onto one end section of said auger conveyor, said auger screw being rotated to move said extractive-containing material at a controlled rate through said extraction zone to said second opening, said auger conveyor being further positioned to permit said process solvent to be distributed over the top surfaces of said extractive-containing material substance at one or more points along the length of said auger conveyor such that said process solvent flows by gravity down through said extractive-containing material as said auger screw conveys said extractive-containing material through said extraction zone to provide contact between said process solvent and said extractive-containing material that promotes extraction of said extractive by said process solvent to form said miscella and said extractive-depleted substrate.

7. The process of claim 1 wherein said extractive-containing material is received as aggregates, and prior to transfer to said extraction zone, said extractive-containing material is crushed and ground in a crushing/grinding machine to reduce particle size distribution of said aggregates to enhance solvent extraction in said extraction zone.

8. The process of claim 7 wherein said extractive-containing material is ground or crushed in admixture with extractive, said process solvent, or a mixture of said extractive or said process solvent, to form a slurry or paste comprising the ground extractive-containing material, and said slurry or paste is transported into said extraction zone.

9. The process of claim 1 wherein said extractive-containing material is gravity charged into said extraction zone continuously at a controlled rate using a system comprised of first and second lock hoppers in parallel, wherein each of said lock hoppers includes a valve at the top of said lock hopper through which said extractive-containing material is charged to said lock hopper when said valve is open and which can be closed to seal said lock hopper and a second valve at the bottom of said lock hopper through which said extractive-containing material is conveyed out of said lock hopper into said extraction zone when said second valve is open and which can be closed to seal said extractive-containing material in said extraction zone, the charging procedure being comprised of the steps of:

a. opening said top valve and closing said bottom valve of said first lock hopper that has been emptied, b. feeding said extractive-containing material into said first lock hopper through its said open top valve, and then closing its said top valve and opening its said bottom valve to feed said extractive-containing material that have been accumulated in said lock hopper into said extraction zone;

c. simultaneously, opening said top valve of a second lock hopper with its said bottom valve closed to convey said extractive-containing material into said second lock hopper; and d. repeating this operating sequence alternating between said lock hoppers so that said extractive-containing material is charged continuously into said extraction zone.

10. The process of claim 1 wherein said extractive-depleted substrate is conveyed out of said extraction zone using a system comprised of a first and second lock hoppers in parallel, wherein each said lock hopper includes a valve at the top of said lock hopper through which said extractive-depleted substrate is charged to said lock hopper when said valve is open and which can be closed to seal said lock hopper and a second valve at the bottom of said lock hopper through which said extractive-depleted substrate is conveyed out of said lock hopper when said second valve is opened and which can be closed to seal said extractive-depleted substrate in said lock hopper, the charging procedure being comprised of the steps of:

a. opening said top valve and closing said bottom valve of said first lock hopper that is empty, and feeding said extractive-depleted material into said first lock hopper through its said open top valve, and then closing its said top valve and opening its said bottom valve to exit said extractive-containing material that have been accumulated in said lock hopper;

b. simultaneously, opening said top valve of said second lock hopper with its said bottom valve closed to convey said extractive-depleted material into said second lock hopper, and then closing its said top valve and opening its said bottom valve to exit said extractive-depleted material that has been accumulated in said lock hopper; and c. repeating this operating sequence alternating between said lock hoppers so that said extractive-depleted material is discharged continuously from said extraction zone.

11. The process of claim 10 wherein said extractive-depleted substrate flowing into said receiving lock hopper contains process solvent in a vapor state and each of said lock hoppers includes a conduit for conveying process solvent in a vapor state from said lock hoppers to an inlet of a compressor, the process comprising the additional steps of:

i. separating process solvent in a vapor state from said extractive-depleted substrate in said receiving lock hopper;

ii. conveying the separated process solvent from said receiving lock hopper to a suction side of said compressor; and iii. condensing the compressed process solvent vapor stream in a condenser heat exchanger and feeding the condensed process solvent back to said extraction zone as part of said process solvent.

12. A solvent extraction process using a process solvent to extract an extractive from an extractive-containing material, the process comprising the step of contacting said extractive-containing material with said process solvent in an extraction zone operated under extraction conditions to form a miscella and a extractive-depleted substrate, wherein said extraction zone comprises a vessel having walls forming a pressurized chamber in which is mounted a rotating helical auger screw conveyor having its auger screw positioned therein to receive said extractive-containing material, said walls being provided with a first opening through which said extractive-containing material can be introduced into said chamber, said walls being provided with a second opening separated from first opening through which said extractive-deleted substrate can exit from said extraction zone, said extractive-containing material being continuously fed through said first opening onto one end section of said auger conveyor, said auger screw being rotated to move said extractive-containing material at a controlled rate through said extraction zone to said second opening, said auger conveyor being further positioned to permit said process solvent to be distributed over the top surfaces of said extractive-containing material substance at one or more points along the length of said auger conveyor such that said process solvent flows by gravity down through said extractive-containing material as said auger screw conveys said extractive-containing material through said extraction zone to provide contact between said process solvent and said extractive-containing material that promotes extraction of said extractive by said process solvent to form said miscella and said extractive-depleted substrate; and wherein said walls are provided with at least one third opening over which is positioned a porous filter, said third opening positioned under said auger conveyor, said porous filter structured with pores sized to permit flow of said miscella through said pores and out of said extraction zone, and sized to substantially block flow of said extractive-depleted substrate.

13. The process of claim 12 wherein downstream flights of said auger screw positioned closer to said second opening than said first opening are compression screw flights which compress said extractive-depleted substrate to remove at least some of any process solvent in said extractive-depleted substrate as said compression screw flights convey said extractive-depleted substrate.

14. The process of claim 13 further comprising the step of conveying said extractive-depleted substrate through said extraction zone and into said third opening by operation of said compression screw flights in a manner that said compression screw flights and said walls cause said extractive-depleted substrate to form a seal in said extraction zone adjacent said third opening sufficient to reduce any flow of said process solvent from said extraction zone through said third opening.

15. A solvent extraction process using a process solvent to extract an extractive from an extractive-containing material, the process comprising the step of contacting said extractive-containing material with said process solvent in an extraction zone operated under extraction conditions to form a miscella and a extractive-depleted substrate, wherein said extraction zone comprises a vessel having walls forming a pressurized chamber in which is mounted a continuous moving belt conveyor onto which said extractive-containing material is continuously fed at a controlled rate onto said belt conveyor, said belt conveyor transports said extractive-containing material at a controlled rate through said extraction zone while said process solvent is distributed over said extractive-containing material at a multiplicity of points along the length of said conveyor belt such that said process solvent flows down through said extractive-containing material and out of said extractive-containing material by gravity as said continuous belt conveyor carries said substance through said extraction zone to provide contact between said process solvent and said extractive-containing material to promote extraction of said extractive by said process solvent to form said miscella, said miscella being accumulated and then removed from said extraction zone, and the extractive-depleted substrate being conveyed by said conveyor belt out of the said extraction zone.

16. A process according to claim 15, wherein hoppers are mounted to said continuous moving belt conveyor in a manner that said extractive-containing material is continuously fed into said hoppers and said belt conveyor transports said extractive-containing material in said hoppers at a controlled rate through said extraction zone, and said process solvent is distributed over said extractive-containing material in said hoppers along the length of said conveyor belt such that said process solvent flows down through said substance by gravity as said continuous belt conveyor moves said substance in said hoppers through said extraction zone to provide contact between said process solvent and said extractive-containing material to promote extraction of said extractive by said process solvent to form said miscella, said miscella is accumulated and removed from said extraction zone, and said extractive-depleted substrate is dumped out of said extraction zone by said hoppers.

17. A solvent extraction process using a process solvent to extract an extractive from an extractive-containing material, the process comprising the steps of:

a. grinding and crushing said extractive-containing material in a first grinding zone to reduce particle size distribution of said extractive-containing material sufficient to enhance extraction of said extractive and to maintain a free flowing capability of said extractive-containing material after grinding;

b. contacting the ground extractive-containing material with process solvent in a first extraction zone operated under extraction conditions to form a miscella and a extractive-depleted substrate;

c. conveying said extractive-depleted substrate to a second grinding zone wherein said extractive-depleted substrate is ground under extraction conditions to a finer particle size distribution still sufficient to retain the free-flowing capability of the ground extractive-depleted substrate, d. contacting said ground extractive-depleted substrate with said process solvent in a second extraction zone to form a second miscella and a second extractive-depleted substrate essentially free of extractive;

e. accumulating and then transferring said miscella and second miscella to a filtration zone wherein said miscella and second miscella under extraction conditions are passed through a microfiltration, an ultrafiltration, a nanofiltration, or a reverse osmosis filtration membrane to produce a liquid solvent-rich permeate and a extractive-rich retentate; and f. recycling all or part of said liquid solvent-rich permeate as all or part of said process solvent in said extraction zone or said second extraction zone.

18. In a solvent extraction process for the extraction of an extractive from an extractive-containing material employing in an extraction zone operating under extraction conditions a solvent consisting essentially of a process solvent, whereby a miscella and a extractive-depleted substrate is formed, the improvement to which comprises:

(a) removing said miscella from said extraction zone under extraction conditions, (b) filtering said miscella by use of a microfiltration, an ultrafiltration, a nanofiltration, or a reverse osmosis membrane, under conditions to achieve a differential pressure across said membrane to maintain at least some of said process solvent in said miscella in a liquid state, to separate said process solvent in said miscella from said extractive in said miscella, (c) recycling under extraction conditions at least a portion of the separated solvent to said extraction zone; and (d) grinding said extractive-depleted substrate under extraction conditions to form a smaller particle sized extractive-depleted substrate.

19. A solvent extraction process using a solvent consisting essentially of a process solvent to extract an extractive from an extractive-containing material, the process comprising the steps of:

a. contacting said extractive-containing material with said solvent in an extraction zone operated under extraction conditions to form a miscella and an extractive-depleted substrate;

b. separating said miscella from said extractive-depleted substract under extraction conditions; and c. filtering said miscella by use of a microfiltration, ultrafiltration, nanofiltration, or reverse osmosis filtration membrane under conditions to achieve a differential pressure across said membrane to form separated process solvent-rich permeate and an extractive-rich retentate streams.

20. A solvent extraction process according to claim 19 wherein said filtering of said miscella through said filtration membrane is performed under conditions necessary for at least some of said solvent to remain in a liquid state; and subjecting said retentate from step (c) to stripping conditions in a stripping zone such that residual solvent that may be present in said retentate is stripped out of said retentate to produce an extractive that is essentially free of said solvent and to produce a vapor stream comprising solvent in a vapor state.

21. A solvent extraction process using a solvent to extract an extractive from an extractive-containing material, the process comprising the steps of:

a. contacting said extractive-containing material with said solvent in an extraction zone operated under extraction conditions to form a miscella and an extractive-depleted substrate;

b. separating said miscella from said extractive-depleted substract under extraction conditions; and c. filtering said miscella by use of a microfiltration, ultrafiltration, nanofiltration, or reverse osmosis high volume filtration membrane under conditions to achieve a differential pressure across said membrane to form separated process solvent-rich permeate and an extractive-rich retentate streams.

22. A solvent extraction process according to claim 21 wherein said filtering of said miscella through said filtration membrane is performed under conditions necessary for at least some of said solvent to remain in a liquid state; and subjecting said retentate from step (c) to stripping conditions in a stripping zone such that residual solvent that may be present in said retentate is stripped out of said retentate to produce an extractive that is essentially free of said solvent and to produce a vapor stream comprising solvent in a vapor state.

23. A solvent extraction process using a solvent to extract an extractive from an extractive-containing material, the process comprising the steps of:

a. contacting said extractive-containing material with said solvent in an extraction zone operated under extraction conditions to form a miscella and an extractive-depleted substrate;

b. separating said miscella from said extractive-depleted substract under extraction conditions; and c. filtering said miscella by use of a ceramic filter constructed having a flow through center wall having pores of a pre-determined pore size under conditions to achieve a differential pressure across said center wall to form separated solvent-rich permeate and extractive-rich retentate screams; wherein said filtering of said miscella through said filter is performed under conditions necessary for at least some of said solvent to remain in a liquid state; and subjecting said retentate from step (c) to stripping conditions in a stripping zone such that residual solvent that may be present in said retentate is stripped out of said retentate to produce an extractive that is essentially free of said solvent and to produce a vapor stream comprising solvent in a vapor state.

24. In a solvent extraction process for the extraction of an extractive from an extractive-containing material employing in an extraction zone operating under extraction conditions a solvent consisting essentially of a process solvent; whereby a miscella and a extractive-depleted substrate is formed, the improvement to which comprises:

(a) removing said miscella from said extraction zone under extraction conditions, (b) filtering at temperatures up to 140° F. and pressures less than 200 psig said miscella by use of a microfiltration, an ultrafiltration, a nanofiltration, or a reverse osmosis membrane, under conditions to achieve a differential pressure across said membrane to maintain at least some of said process solvent in said miscella in a liquid state, to separate said process solvent in said miscella from said extractive in said miscella, and (c) recycling under extraction conditions at least a portion of the separated solvent to said extraction zone.

* * * * *